United States Patent [19]

Garrison et al.

[11] 4,174,315

[45] Nov. 13, 1979

[54] ISOLATION OF PROTEIN FROM VEGETABLE SEED MATERIAL

[75] Inventors: Charles M. Garrison, Fairfield; Rudolph W. Youngquist; Harry M. Taylor, both of Cincinnati, all of Ohio

[73] Assignee: The Procter & Gamble Company, Cincinnati, Ohio

[21] Appl. No.: 922,918

[22] Filed: Jul. 7, 1978

[51] Int. Cl.$^2$ .................................................. A23J 1/14
[52] U.S. Cl. ................................. 260/123.5; 426/656
[58] Field of Search ......................... 260/112 R, 123.5

[56] References Cited

U.S. PATENT DOCUMENTS

| | | | |
|---|---|---|---|
| 2,495,706 | 1/1950 | DeVoss et al. | 260/123.5 X |
| 2,635,094 | 4/1953 | Belter et al. | 260/123.5 |
| 3,268,503 | 8/1966 | Mustakas et al. | 260/123.5 |
| 3,365,440 | 1/1968 | Circle et al. | 260/123.5 |
| 3,734,901 | 5/1973 | Hayes et al. | 260/123.5 |
| 3,762,929 | 10/1973 | DeLapp | 260/123.5 X |
| 3,878,305 | 4/1975 | Damico et al. | 426/590 X |
| 3,952,115 | 4/1976 | Damico et al. | 426/590 |

OTHER PUBLICATIONS

Plant and Cell Physiol. 16=933-937 (1975), Mikola et al.
Arch. of Biochemistry and Biophysics, 95, (1961), pp. 402-404, Aitschul et al.
Plant Physiology, vol. 42, 1967, pp. 797-813, Tombs.

*Primary Examiner*—Howard E. Schain
*Attorney, Agent, or Firm*—Walter L. Stumpf; Jerry J. Yetter; Richard C. Witte

[57] ABSTRACT

A density fractionation process for recovering vegetable seed protein granules from the remaining portion of the vegetable seeds, said seeds having a lipid concentration of from 0% to 5%, using a ternary, single-phase solution of water, an electrolyte, and a carbohydrate, said solution having a density of from about 1.2 to about 1.5 g/ml and a water activity of less than about 0.85.

17 Claims, 1 Drawing Figure

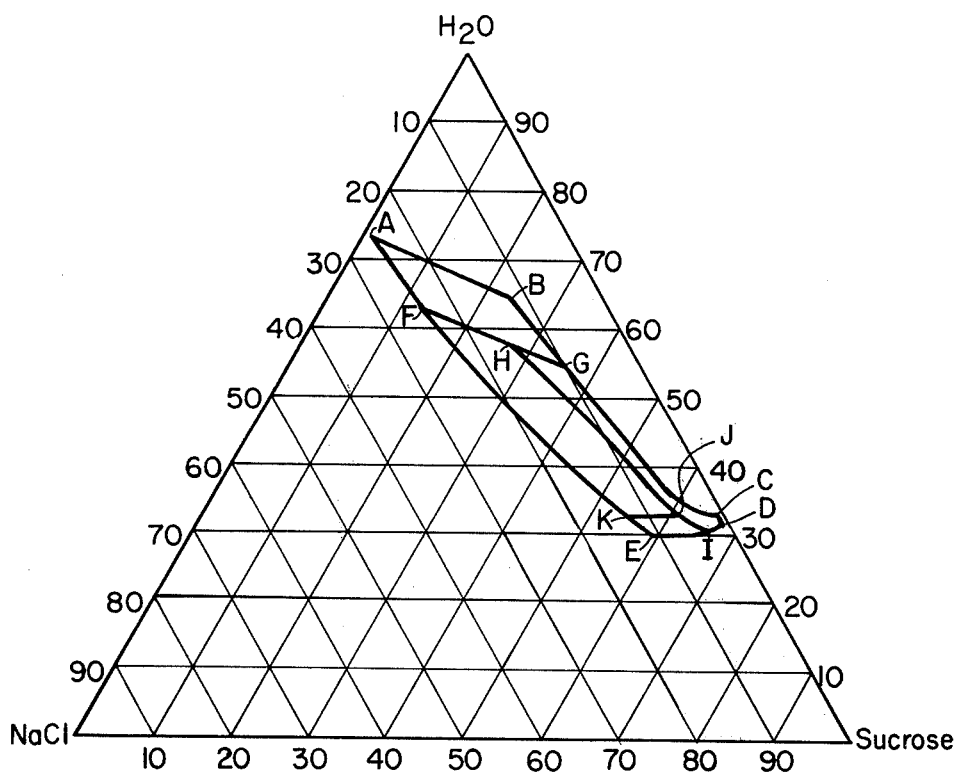

ISOLATION OF PROTEIN FROM VEGETABLE SEED MATERIAL

TECHNICAL FIELD

Many types of vegetable seeds contain protein of sufficient quality and concentration to be nutritionally useful for humans. Unfortunately, because the vegetable seeds are often in a form unacceptable to human tastes, their valuable protein material is not conveniently used. Soybean seeds, for example, not only have high concentrations of protein and a high protein efficiency ratio, they also have seed flavor notes which are unacceptable to many humans as well as other seed materials which tend to induce flatulence. It can be appreciated that there is a continuing need for commercially feasible processes to separate the edible protein present in vegetable seeds from the undesirable and inedible materials. Successful protein separation techniques allow direct human consumption of vegetable protein found in previously inedible or unpalatable sources, for example, the protein-rich residues which are left after the oil is extracted from oleaginous seeds such as soybeans.

The walls and cells of desirable seed sources of vegetable protein consist primarily of lipid, insoluble cellulosic materials, soluble carbohydrates, etc. In such vegetable seed protein sources, the majority of the protein is present in the form of discrete granules. Accordingly, the protein granules need to be released from the balance of the seed structure to be used, for example, in the manufacture of vegetable-based meat analog products, and the like.

The protein of vegetable seeds, especially oleaginous seeds such as soybeans, peanuts, sunflower seeds, and cottonseeds, is usually obtained in the form of isolate or concentrate. The vegetable seeds are first comminuted or ground to form flakes, meals, or flours, which are either extracted with a solvent, e.g., hexane, or pressed to remove the oil and lipid materials. This defatted mass can be washed with an alcohol/water solution to dissolve and remove soluble nonproteinaceous material and yield a concentrate. Concentrates, however, generally have low protein contents.

Traditional protein extraction processes for producing isolates from the defatted mass use aqueous alkaline solutions or water to solubilize the protein. The solubilized protein can then be removed from the insoluble seed materials and precipitated and recovered by various means; isoelectric precipitation, for example.

There are many inherent disadvantages in the art-disclosed protein extraction procedures. The tendency to denature the protein by excessive heat or harsh pH's detrimentally affects the physical and chemical characteristics of the protein. Denatured proteins are difficult to use in certain commercial applications. Some separation methods use flammable solvent systems. Still other methods use halogenated organic solvents, which may be undesirable where the ultimate product is to be consumed by humans.

As noted many types of vegetable seeds, especially oleaginous seeds such as soybeans and cottonseeds, contain their protein in the form of discrete particles. The present invention provides a means for conveniently separating such protein particles from vegetable seeds of low lipid content by means of a density fractionation process. In this process, a toxicologically-acceptable, ternary solvent system comprising water, a carbohydrate (e.g. sucrose) and an electrolyte, (e.g., sodium or potassium chloride) is used to separate the protein particles from the other cellular components.

BACKGROUND ART

M. P. Tombs, *Plant Physiology*, 42, 797 (1967) describes a method of isolating protein bodies from soy meal by density gradient centrifugation using a 70% to 90% (wt/vol) aqueous sucrose solution having a density from 1.25 to about 1.34. The reference also describes the swelling and bursting of protein bodies when the meal is placed in contact with water, a problem which is said to be solved by buffering at pH 5.

Certain other density fractionation-type processes for separating protein from other cellular materials are known. U.S. Pat. No. 3,828,017, Finley, et al. (1974) discloses the centrifugation of a slurry of pulverized soy material and liquid fluorocarbon having a density of 1.35 to 1.45.

Other methods for isolating protein have involved extraction with mixtures of polar and nonpolar solvents and dissolution with reprecipitation of protein. U.S. Pat. No. 2,278,670, Rauer, Apr. 7, 1942, discloses a two-step process for recovering protein using organic solvents and alkali.

U.S. Pat. No. 3,043,826, Beaber, et al., July 10, 1962 discloses the extraction of protein from alcohol-treated soybean material by contact with water at alkaline or acidic pH's and with subsequent recovery by precipitation.

Japanese Pat. No. 2,130,942, Ajinomoto, Apr. 22, 1976 (abstract) discloses the separation of protein material by isoelectric precipitation.

Other separation procedures are also known. U.S. Pat. No. 3,734,901, Hayes, et al., May 22, 1973 discloses a protein concentration step in which nonproteinaceous materials are separated from vegetable seed material using a monohydric alcohol/water extraction medium. U.S. Pat. No. 3,649,293, Hoer, et al., Mar. 14, 1972 teaches the separation of protein by solubilizing the protein, depositing the protein on solid cellular material, and separating the protein-carrying solids, which are processed further.

Claim 1 of U.S. Pat. No. 4,089,848, Bell, et al., May 16, 1978, discloses a method for separating protein from de-oiled oats. The claimed process involves dissolving oats in alkaline solution, acidifying to separate acid soluble impurities, and then recovering acid soluble protein.

BRIEF DESCRIPTION OF THE DRAWINGS

The FIGURE illustrates a phase diagram of the preferred water/carbohydrate/electrolyte system in which the carbohydrate is sucrose and the electrolyte is sodium chloride.

The area enclosed by ABCDE defines the concentrations of the components used in the solutions in the manner of claim 1. Line AB represents the boundary where the density is 1.20; Line BC represents the boundary where the water activity ($a_w$) is 0.85; Line CD represents the boundary where the sucrose concentration is 1%; and Line DEA represents the phase boundary between the ternary, monophase solution used in this invention and the various multiphase systems which can be formed with water, sucrose, and sodium chloride. The area bounded by ABCDE is a ternary solution having a density of from about 1.2 to about 1.5 and a water activity of less than about 0.85.

The area bounded by FGCDE defines the preferred solution used in the manner of claim 2. The boundary FG corresponds to a density of 1.25.

The area bounded by FHIE defines the solution used in the manner of claim 3. The Line FH represents a density of 1.25; the Line HI represents a water activity of 0.8; and Line IEF represents the phase boundary of the solution. The more preferred compositions defined by the area bounded by FHIE have densities of from about 1.25 to about 1.50 and water activities of 0.5 to about 0.8.

The area bounded by FHJK defines the solution used in the manner of claim 4 which is the most preferred composition of the invention. For water/sucrose/sodium chloride solutions, Line FH represents a density of 1.25; Line HJ represents a water activity of 0.8; Line JK represents the boundary where the solution viscosity is 300 cp; and Line KF defines the phase boundary. The area bounded by FHJK defines solutions having compositions with a density of from about 1.25 to about 1.50, a water activity of from 0.5 to 0.8, and a viscosity of from about 1 centipoise (cp) to about 300 cp.

DISCLOSURE OF THE INVENTION

The present invention encompasses a process for recovering vegetable seed protein granules from vegetable seed material, comprising suspending comminuted vegetable seed material having from 0% to about 5% lipid and containing protein granules in an aqueous solution comprising an electrolyte and a carbohydrate, said solution having a density of from about 1.2 to about 1.5 and a water activity of less than about 0.85, and isolating the vegetable seed protein granules from the balance of the vegetable seed material.

The present invention also encompasses a process for recovering vegetable seed protein granules from vegetable seed material having from 0% to about 5% lipid, comprising:
  (1) comminuting said vegetable seed material;
  (2) suspending said vegetable seed material in an aqueous solution comprising an electrolyte and a carbohydrate, said solution having a density of from about 1.2 to about 1.5, and a water activity of less than about 0.85;
  (3) isolating the vegetable seed protein granules from the balance of the seed materials; followed by the additional step of;
  (4) washing the vegetable seed protein granules with a water/alcohol solvent mixture to selectively extract residual non-proteinaceous components from the protein granules.

The present invention takes advantage of the fact that the difference in density between the protein granules and the residual cellular material of comminuted vegetable seed material can be used as a basis for a density fractionation process. Through the careful control of density, water activity and viscosity of the ternary water/carbohydrate/electrolyte solution, separations can be made with ease, and without hydrating and detrimentally denaturing the protein granules or proteins contained therein. The product is a vegetable protein having superior physical characteristics for commercial formulation as well as superior flavor and protein quality.

By "vegetable seed protein granules" and "protein granules" as used herein is meant aleurone grains or protein bodies. Aleurone grains and protein bodies are granules of reserve or storage protein and are typically found in the seeds of many species of plants. Such reserve or storage proteins differ in their physical and chemical properties from proteins typically found in generalized cell protoplasm. Such subcellar granules or organelles contain most of the protein material, for example, in soybeans. Protein bodies and aleurone granules range in diameter from the $0.1\mu$ in the high lysine corn mutant "opaque-2," to about $20\mu$ in soybeans; a typical size range is from 2 to $8\mu$.

By "vegetable seed material" as used herein is meant plant seeds which contain protein granules. Among the vegetable seed materials known to contain protein granules are cereal grains including rice, oats, barley, millet, corn, grain sorghum, and immature wheat (in mature wheat the granules fuse together). Other vegetable seed materials which can be used herein include various non-oleaginous legumes such as peas, broad beans, jack beans, lima beans, mung beans, and lentils, all of which are reported as having protein granules.

The preferred class of vegetable seed materials used herein encompasses the "oleaginous seeds." By "oleaginous seeds" is meant such oil- and protein granule-containing seeds as cottonseeds, soybeans, peanuts, rapeseed, copra, sunflower seeds, and the like. The most preferred vegetable seed material is the seed of the soybean. By "having from 0% to about 5% lipid" is meant that if the vegetable seed material contains more than 5% lipid in its natural state the amount of lipid present has been reduced to less than about 5% by a conventional method such as pressing or hexane solvent extraction (defatting). Typically, oleaginous seeds are defatted to recover their valuable oils. Defatted oleaginous seeds usually contain up to about 5% lipid. Preferred for use herein are such defatted oleaginous seed materials as soy or cottonseed meals, soy or cottonseed flours, and soy or cottonseed concentrates.

By "electrolyte" as used herein is meant a chemical substance which ionizes in the presence of water to form cations and anions and which will provide ionic conductivity when dissolved in water. Electrolytes which can be used herein include the alkali metal halides and alkali metal phosphates, examples include lithium chloride and potassium and sodium dihydrogen phosphate. Sodium chloride and potassium chloride are highly preferred electrolytes, and potassium chloride is particularly preferred if a low sodium protein product is desired.

The term "carbohydrate" is used herein in its usual context to mean a water-soluble saccharidic compound of carbon, hydrogen, and oxygen that contains the saccharose grouping. Soluble monosaccharides, disaccharides, and low molecular weight polysaccharides are preferred types of carbohydrates suitable for use herein.

Monosaccharides useful herein include simple sugars such as fructose and glucose. Disaccharides include such compounds as sucrose, maltose, and lactose.

The carbohydrates used herein can be either purified or unrefined. For example, corn syrup, a mixture of glucose, maltose, and maltodextrine, can be used as the carbohydrate component. Highly preferred carbohydrates are the nonreducing disaccharides, in particular, sucrose. Other carbohydrates which can be used herein include fructose, glucose, raffinose, stachyose, corn syrup solids, low molecular weight dextrans, and soluble plant sugars.

The term "water activity" ($a_w$) is used herein in its usual context to mean the ratio of the fugacity of water in a solution (f) to that of pure water ($f_0$) at the same temperature. The water activity of a solution can be measured using well-known physical chemical techniques and can conveniently be measured using a Sina Hygrometer, Type SMT-B. The water activity of an ideal aqueous solution is 0.9823 for a 1.0 molal solution. Nonelectrolytes depart from ideal behavior only slightly at low concentrations. However, as the concentration of electrolytes increases, their solutions depart significantly from ideal behavior.

By "isolating" as used herein is meant a separation procedure by which the protein granules can be separated from the residual vegetable seed material. This separation is usually accomplished using centrifugation to perform a density fractionation followed by a physical separation and removal of the protein granule layer from the remainder of the density fractionated mixture. The isolation step can be performed at high or low centrifuge velocities and can even be accomplished by letting the suspension of comminuted seed material fractionate by the force of gravity. Centrifugation is the preferred mode for density fractionation, and useful centrifuge forces for this purpose are typically in the range of 1,700 g to 17,000 g.

By "comprising" is meant that other materials may be present in the ternary solution and other processing steps can take place so long as they do not adversely affect either the vegetable material or the required physical chemical characteristics of the aqueous solution used for the density fractionation. Thus, the term comprising encompasses the more restrictive terms "consisting essentially of" and "consisting of."

Composition percentages used herein are weight/weight.

To achieve an efficient separation of the protein granules from the other components of the vegetable seed material during the density fractionation process, the vegetable seed material must be finely ground or comminuted. The grinding or comminution frees as many of the protein granules as possible from the cellular structure of the seeds. Especially where oleaginous seeds are used, this grinding is more easily accomplished if the seed material is defatted to a lipid concentration of less than about 5% before grinding. However, oleaginous seeds can first be flaked or ground and then defatted for use in the present process.

Any conventional method of defatting oleaginous seeds can be used. In most conventional defatting processes, the oleaginous seed is first roll milled or comminuted to form thin flakes or meal. This exposes a greater surface area and accelerates the defatting process. The flakes or meal are then either pressed to remove the oil and lipid materials, or extracted with a solvent such as hexane. The solvent is then removed by methods such as air drying to produce low lipid content oleaginous seed flakes, meal, or flour.

Any conventional mode of grinding can be used to reduce the particle size of the low lipid content vegetable material. The following methods are examples of acceptable grinding methods: jet milling, pin milling, hammer milling, ball milling, or vibrational energy milling. Jet milling is especially efficient in reducing the particle size of the seed material.

The particle size of the ground seed material should be in the range of about 20 to about 150 microns. The particle size can be less than about 20 microns; however as the particle size is reduced, the protein granules also become comminuted with a resulting increase in protein loss from solubilization. Preferably, at least 90% (by weight) of the seed material will be less than about 80 microns to promote an efficient separation and release of the protein granules from other cellular material by the present process.

In the preferred method of this invention, defatted soybean flakes, meal or concentrate with a lipid content of 0% to about 5% are milled to a particle size of about 30 to about 80 microns.

The comminuted, low-lipid seed material is added to a solution comprising the aqueous carbohydrate/electrolyte fractionation solution of the specified density and $a_w$. The carbohydrate is the major element in controlling the density of the fractionation solution. The density range, in grams/ml, for the fractionation solutions used in the present invention is from about 1.20 to 1.50 with a preferred density range of from about 1.25 to about 1.50. When operating in this range, the protein granules are easily separated from the aqueous solution and completely separated from the more dense, insoluble residual vegetable seed materials, such as cellulose and other insoluble carbohydrate materials, present in the starting vegetable material. The carbohydrate also exerts a small effect in reducing the $a_w$.

The electrolyte in the fractionation solution performs a two-fold function: first, it tends to lessen the viscosity of the carbohydrate/water solution to a small extent, thereby helping keep the viscosity of the solution in a more convenient range for handling; second, it reduces the water activity of the solution, thereby greatly facilitating the separation. Applicants have discovered that high water activity has a detrimental effect on protein separations involving vegetable seed material. Unless the water activity is kept lower than about 0.85, and preferably in the range of from about 0.5 to about 0.8, both the protein granules and the low lipid seed residues hydrate and swell, and, as a result, the densities of the protein granules and the seed residues approach one another. If hydration is allowed to occur and the densities of all materials in the separation solution become too close, a separation based on density will be difficult to achieve. By maintaining the water activity within the range specified herein, hydration is reduced, the density difference between the protein granules and the seed residue is maintained, and separation can be achieved to yield high quality protein.

Still another benefit of the low water activity required for the separation is the inhibition of bacterial growth; something of an antimicrobial effect is achieved.

Food or feed-approved antibacterial, anti-fungal, and antioxidant agents can be added to the aqueous solution of the electrolyte and carbohydrate without deleterious effect. Such additives are preferred when the density fractionation process is operated at or above room temperature for several hours.

At certain concentrations of electrolyte and carbohydrate, the solution may become inconveniently viscous, either from the suspended comminuted vegetable seed material or from dissolution of the soluble sugars naturally present in the vegetable seed material. For ease in handling the solution, it is preferred to maintain a viscosity of from about 1 centipoise to about 300 centipoise; a viscosity of from about 1 centipoise to about 100 centipoise is most preferred.

In a typical procedure, the comminuted, low-fat seed matter is suspended, through intimate mixing, in the aqueous solution of electrolyte and carbohydrate. Any conventional mode of mixing can be used. High shear mixing is preferred, but simple stirring is also an acceptable mode.

A vegetable seed material to solution ratio of about 1:4 to about 1:100 (parts by weight) is acceptable for use in this process. Preferred for use herein is a defatted, comminuted oleaginous seed: solution ratio of about 1:5 to about 1:20 (parts by weight).

The contact time between the carbohydrate/electrolyte/water solution and the protein granules, as well as the temperature, affects the yield and the amount of protein recovered.

Generally, from about 20 minutes to 15 hours of mixing time is sufficient. The time of mixing depends both upon the temperature of the solution and the type of mixing used. Simple magnetic stirring at 25° C. requires about 1-2 hours. High shear mixing using a higher temperature, 50° C., for example, requires less time.

The temperature at which the mixing occurs and at which the density fractionation is accomplished can be from about 0° C. to about 120° C., preferably from about 5° C. to 70° C., and most preferably from about 15° C. to about 50° C. The higher the temperature, the less viscous the solution and thus the easier to handle. However, as the temperature is increased, the rate of hydration of the protein and seed residues increases even in the $a_w$ ranges specified herein. (The rate of denaturation of the protein also increases with temperature.) Thus, the control of water activity levels at temperatures higher than about 70° C. is more critical in achieving an efficient separation.

After mixing, the vegetable seed material/water/electrolyte/carbohydrate mixture is separated, preferably by centrifugation. The upper layer contains 60% to 90% of the protein (as granules) present in the starting vegetable material. The middle layer consists of water/electrolyte/carbohydrate solution, which also contains water-soluble salts and sugars present in the vegetable seed material and a minor amount of protein. The bottom layer is primarily composed of the insoluble cellulosic and insoluble carbohydrate materials that make up the seed walls and other portions of the seed; however, a minor amount of protein may also be present in this layer.

The top, protein granule containing layer is separated from the two remaining layers. The protein recovery in this layer is typically 80% of the protein present in the original vegetable seed material. The remaining protein is found either in the aqueous solution or is still associated with the insoluble carbohydrates. The aqueous electrolyte/carbohydrate solution can be recycled.

In a preferred mode, the present invention also encompasses a process which comprises the suspension of comminuted, defatted vegetable seed material with the three-component aqueous solution as described; the isolation of the protein granules from the vegetable seed residue as described; and as a final, optional step, a concentration/extraction treatment which selectively extracts residual, nonproteinaceous components from the protein granules and further concentrates the protein.

For example, extraction of the protein granules separated by centrifugation with one of the following water-alcohol systems provides concentrated oleaginous seed protein. This solvent extraction further concentrates the separated protein by dissolving and carrying away any residual non-proteinaceous components, principally extraneous vegetable carbohydrates.

The alcohols suitable for practicing the optional extraction/concentration step include the lower molecular weight alcohols, such as methanol, ethanol, 1-propanol, 2-propanol, and the butanols. The most preferred alcohol is ethanol, for both organoleptic and safety reasons.

The preferred water-ethanol extraction solvent comprises from about 50 parts by weight to about 90 parts by weight alcohol, the balance being water. The most preferred water-alcohol system is from about 50 parts to about 70 parts ethanol and from about 30 to about 50 parts water (by weight).

The optional concentration/extraction step can be conducted in a temperature range from about 20° C. to about 60° C.; about 20° C. to about 30° C. is preferred.

Final desolventizing of the protein granules, whether or not the optional concentration/extraction step is performed, is not critical and can be achieved by conventional means such as free draining or centrifugation followed by forced air drying, filtration followed by drying, etc. The preferred methods are forced air drying of drained flakes at a temperature of from about 40° C. to about 90° C. and steam desolventizing.

BEST MODE OF CARRYING OUT THE INVENTION

| Liquid System | Parts by Weight |
| --- | --- |
| Sucrose | 44 |
| Sodium chloride | 16 |
| Water | 40 |

The ternary solvent system of sucrose, sodium chloride, and water has the density of 1.35 g/ml and an $a_w$ of 0.7. Defatted soy flour (500 g) having a particle size of between 20 and 100 microns is mixed with 5000 g of the liquid system and centrifuged for 45 minutes at room temperature and 5000 g. Two semi-solid layers separated by a liquid layer are produced.

The upper layer is separated by decantation and washed with 40% water/60% ethanol at 20° C. to remove any residual soluble solvent components and then air dried. This layer is the high protein layer and contains about 88% protein on a dry basis. This represents a yield of about 80% of the protein present in the defatted soy flour.

The bottom solid layer is also washed with 40% water/60% ethanol. It contains about 33% protein on a dry basis along with the insoluble carbohydrate and cellulosic materials.

Similar results are obtained when the sodium chloride is replaced by an equivalent amount of potassium chloride.

When the defatted soybean flour is replaced by a defatted soybean meal or defatted soybean concentrate, similar results are obtained.

When the defatted soybean flour is replaced by defatted peanut flour, defatted cottonseed meal, or defatted peanut concentrate, similar results are obtained.

An animal feeding study was used to determine the protein efficiency ratio (PER) of several soy protein samples, including the soy protein isolated by the process described herein.

Male, weanling Sprague-Dawley, Charles River derived rats that were 21 days old and 50-55 grams in weight were used in the study. There were six rats per group and the feeding study was conducted for three weeks. Food consumption was recorded twice weekly and weight gained recorded once per week. The basic basal diet was as follows:

| Ingredients | Percent of Diet |
|---|---|
| Sucrose | 37 |
| Corn starch | 37.5 |
| Protein | 9.5 |
| Amino acid mix | 0.5 |
| Corn oil | 10 |
| Salt mix (modified Bernhardt and Tomarelli | 5.0 |
| Vitamin mix No. 2 | 0.5 |
| Choline chloride | 0.2 |

The protein samples used in this experiment were soy protein isolated by the density separation process herein, a commercially available 90% soy isolate, casein and freeze-dried cooked ground beef. The following PER values were obtained:

| Protein | PER |
|---|---|
| Casein | 2.5 |
| Cooked ground beef (freeze dried) | 3.0 |
| Density separated soy protein (80% protein) | 1.8 |
| Commerical isolate (90% isolated soy protein) | 1.4 |

When the density separated soy protein was supplemented with a nutritionally-supplemental amount of N-acetyl-L-methionine or its derivatives, in the manner disclosed in U.S. Pat. Nos. 3,878,305 and 3,952,115, incorporated herein by reference, the PER value is equal to ground beef, i.e., 3.0, while the commercial isolate supplemented with an equal amount of N-acetyl-L-methionine has a PER value of 2.5.

INDUSTRIAL APPLICABILITY

EXAMPLE I

| Liquid System (Density 1.33) | Parts by Weight |
|---|---|
| Sucrose | 38.1 |
| Sodium chloride | 18.4 |
| Water | 43.5 |

| Liquid System (Density 1.34) | Parts by Weight |
|---|---|
| Sucrose | 41 |
| Sodium chloride | 16.5 |
| Water | 42.5 |

Defatted soybeans were ground for four hours in a vibratory energy mill (Sweco$^R$) to produce a fine flour having an average particle size of less than 80 microns. This flour was mixed with each of the liquid systems above in a ratio of 1 part flour to 15 parts of liquid system.

These mixtures were centrifuged at 10,000 g and a temperature of about 10° C. to 15° C.

In both cases, i.e., when the density of the fluid is 1.33 and 1.34, four layers, three of which were semi-solid, were formed: a packed layer on top, followed by a liquid layer, a mushy semi-solid layer, and a lower packed layer.

The topmost packed layer is separated, extracted and concentrated by an ethanol/water wash to remove further sugars, and the protein content measured. When the density of the liquid system is 1.33, the upper layer contains 94.1% protein on a dry basis which represents 61% of the protein in the starting defatted soy flour.

When the density of the liquid system is 1.34, the upper layer contains 95% protein on a dry basis which represents 62% of the protein initially present in the defatted soy flour.

When the sucrose is replaced by equivalent amounts of glucose or corn syrup solids to obtain the same densities as in Example I, similar results can be obtained.

EXAMPLE II

| Liquid System | Parts by Weight |
|---|---|
| Sucrose | 49 |
| Potassium chloride | 14 |
| Water | 37 |

The liquid system of sucrose, potassium chloride, and water has a density of about 1.35 and a water activity of about 0.75. Defatted peanut flour (100 g) is mixed with the liquid system (1000 g) and centrifuged for about 20 minutes at 30° C. Two solid layers separated by a liquid layer are produced.

The upper, protein granule containing layer is separated and washed with an alcohol/water solution containing about 50 parts alcohol and 50 parts water. The protein thus isolated is then separated from the water-alcohol solution and air dried at about 60° C. The resulting product is a peanut protein concentrate which is not detrimentally denatured.

Similar results are achieved when defatted cottonseed flour is used in place of peanut flour.

The high quality protein products prepared in the manner of Examples I and II can be used as food supplements for humans or lower animals. These protein products can also be texturized by various well-known means to provide meat analogs in the form of "vegetable-based" ground beef analogs, vegetable-based ground beef patties, vegetable-based sausage, vegetable-based meat or cheese-type spreads, and the like.

What is claimed is:

1. A process for recovering vegetable seed protein granules from vegetable seed material, comprising suspending comminuted vegetable seed material having from 0% to about 5% lipid and containing protein granules in an aqueous solution comprising an electrolyte selected from the group consisting of alkali metal halides and alkali metal phosphates and a carbohydrate at a concentration greater than about 1%, said solution having a density of from about 1.2 to about 1.5 g/ml and a water activity of less than about 0.85, and isolating the vegetable seed protein granules from the balance of the vegetable seed material.

2. A process according to claim 1 wherein said aqueous solution has a density of from about 1.25 to about 1.50.

3. A process according to claim 2 wherein the water activity of said aqueous solution is from about 0.5 to about 0.8.

4. A process according to claim 3 wherein the viscosity of said aqueous solution is from about 1 to about 300 centipoise.

5. A process according to claim 1 wherein said electrolyte is selected from the group of alkali metal halides and alkali metal phosphates.

6. A process according to claim 5 wherein said electrolyte is an alkali metal halide selected from sodium chloride and potassium chloride.

7. A process according to claim 1 wherein said carbohydrate is selected from the group of monosaccharides, disaccharides, trisaccharides, low molecular polysaccharides, or mixtures thereof.

8. A process according to claim 7 wherein said carbohydrate is selected from glucose, sucrose, and corn syrup.

9. A process according to claim 1 wherein said vegetable seed material is an oleaginous seed selected from the group consisting of soybeans, cottonseed, sunflower seed, peanuts, copra, and rapeseed.

10. A process according to claim 9 wherein said vegetable seed material is selected from defatted soybean meal, flour, or concentrate and defatted cottonseed meal, flour, or concentrate.

11. A process according to claim 10 wherein said electrolyte is sodium chloride or potassium chloride and said carbohydrate is sucrose, glucose, or corn syrup.

12. For process for recovering vegetable seed protein granules from vegetable seed material having from 0% to about 5% lipid and containing protein granules, comprising:

(1) comminuting said vegetable seed material;

(2) suspending said vegetable seed material in an aqueous solution comprising an electrolyte selected from the group consisting of alkali metal halides and alkali metal phosphates and a carbohydrate at a concentration greater than about 1%, said solution having a density of from about 1.2 to about 1.5 g/ml and a water activity of less than about 0.85;

(3) isolating the vegetable seed protein granules from the balance of the seed materials; and (4) washing said vegetable seed protein granules with a water/alcohol solvent mixture.

13. A process according to claim 12 wherein said vegetable seed material is selected from soybeans, cottonseed, sunflower seeds, peanuts, rapeseed, and copra.

14. A process according to claim 13 wherein said vegetable seed material is defatted soybean meal, flour or concentrate.

15. A process according to claim 12 wherein said water/alcohol solvent mixture contains from about 50 parts to about 70 parts of an alcohol selected from methanol, ethanol, 1-propanol, 2-propanol, and butanol.

16. A process according to claim 15 wherein said alcohol is ethanol.

17. A process according to claim 16 wherein said electrolyte is sodium chloride or potassium chloride and said carbohydrate is sucrose or corn syrup.

* * * * *